(12) United States Patent
Fok et al.

(10) Patent No.: US 11,610,504 B2
(45) Date of Patent: Mar. 21, 2023

(54) SYSTEMS AND METHODS FOR SCENARIO MARKER INFRASTRUCTURE

(71) Applicant: Toyota Research Institute, Inc., Los Altos, CA (US)

(72) Inventors: Chien-Liang Fok, Belmont, MA (US); Zachary F. Winter, Mountain View, CA (US)

(73) Assignee: TOYOTA RESEARCH INSTITUTE, INC.

( * ) Notice: Subject to any disclaimer, the term of this patent is extended or adjusted under 35 U.S.C. 154(b) by 246 days.

(21) Appl. No.: 16/904,154

(22) Filed: Jun. 17, 2020

(65) Prior Publication Data
US 2021/0398441 A1    Dec. 23, 2021

(51) Int. Cl.
| G09B 9/02  | (2006.01) |
| G09B 9/052 | (2006.01) |
| G09B 19/16 | (2006.01) |
| G09B 9/05  | (2006.01) |

(52) U.S. Cl.
CPC ............... *G09B 9/052* (2013.01); *G09B 9/05* (2013.01); *G09B 19/167* (2013.01)

(58) Field of Classification Search
CPC ......... G09B 9/052; G09B 9/05; G09B 19/167
USPC ............................................ 434/65
See application file for complete search history.

(56) References Cited

U.S. PATENT DOCUMENTS

| 9,336,248 B2 | 5/2016 | Li et al. |
| 10,223,479 B1 | 3/2019 | Konrardy et al. |
| 2016/0314224 A1 | 10/2016 | Wei et al. |
| 2020/0410062 A1* | 12/2020 | O'Malley ............ G05D 1/0088 |

FOREIGN PATENT DOCUMENTS

| CN | 109520744 A | 3/2019 |
| DE | 102018128290 A1 | 5/2019 |
| JP | 5879332 B2 | 3/2016 |

* cited by examiner

Primary Examiner — Robert P Bullington
(74) Attorney, Agent, or Firm — Dinsmore & Shohl LLP (57) ABSTRACT

Systems and methods for scenario marker infrastructure are disclosed. In one embodiment, a method comprises receiving driving scenario data, extracting simulated sensor data from the driving scenario data, extracting scenario markers from the driving scenario data, inputting the simulated sensor data into autonomous driving software, receiving driving instructions output by the driving software, updating a driving status of the autonomous vehicle based on the driving instructions output by the autonomous driving software, creating a simulation log comprising the simulated sensor data and the driving instructions, and inserting the scenario markers into the simulation log.

13 Claims, 5 Drawing Sheets

SYSTEMS AND METHODS FOR SCENARIO MARKER INFRASTRUCTURE

TECHNICAL FIELD

The present specification relates to autonomous vehicle simulation, and more particularly, to scenario marker infrastructure.

BACKGROUND

Autonomous vehicles are able to drive autonomously through a variety of driving environments. Autonomous vehicles typically utilize a variety of sensors to collect sensor data about a driving environment. Software on the autonomous vehicle may then analyze the sensor data to determine driving actions for the vehicle to take to autonomously navigate the vehicle based on the sensor data.

Before deploying an autonomous vehicle in a real-world driving scenario, it may be desirable to test the autonomous driving software in a simulated environment. This may involve creating a variety of simulated driving scenarios and performing a simulation of the autonomous vehicle in each of the driving scenarios. After a simulation is performed, a simulation log may be created detailing the actions performed by the autonomous vehicle in the simulation (e.g., a record of the driving actions recommended by the autonomous driving software in response to simulated sensor data). The simulation log may then be evaluated by either a human or software evaluator to measure the performance of the autonomous driving software.

However, a simulation log may contain a large amount of data including data relating to portions of a simulation that do not need to be evaluated by an evaluator (e.g., lead in or shut down phases). It may be difficult for either a human or software evaluator to determine which portions of a simulation log to evaluate from the simulation log alone. Thus, there is a need for an improved method of annotating simulation logs so that they may be more efficiently evaluated by an evaluator.

SUMMARY

In one embodiment, a method includes performing a simulation of an autonomous vehicle, generating a simulation log based on the simulation, and inserting one or more scenario markers into the simulation log. The one or more scenario markers may indicate one or more phases of the simulation.

In another embodiment, an autonomous driving simulation system may include one or more processors, one or more memory modules, and machine readable instructions stored in the one or more memory modules. When executed by the one or more processors, the machine readable instructions may cause the system to perform a simulation of an autonomous vehicle, generate a simulation log based on the simulation, and insert one or more scenario markers into the simulation log. The one or more scenario markers may indicate one or more phases of the simulation.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein describe systems and methods for scenario marker infrastructure. Autonomous vehicles typically navigate and perform self-driving by gathering sensor data from a plurality of vehicle sensors to detect their surrounding environment. Software running on an autonomous vehicle may continually analyze sensor data and cause the autonomous vehicle to perform driving actions (e.g., by controlling steering, acceleration, and braking) based on the sensor data. As such, the autonomous vehicle may ideally perform self-driving while obeying relevant traffic laws. As obstacles or traffic infrastructures appear in the driving environment (e.g., traffic lights, pedestrians, other vehicles), these obstacles or traffic infrastructures may be detected by the vehicle sensors and the vehicle software may adjust the driving of the autonomous vehicle accordingly.

In order to ensure that an autonomous vehicle behaves as expected while performing self-driving, a simulation of the autonomous vehicle may be run. The simulation may involve creating a simulated driving scenario, and then determining how the autonomous vehicle performs in the simulated driving scenario. More specifically, a driving scenario may simulate inputs to the sensors of the vehicle to create simulated sensor data. The autonomous driving software may then output driving instructions based on the simulated sensor data. The results of the simulation may be recorded in a simulation log.

One or more evaluators may then evaluate the performance of the autonomous driving software in the simulated driving scenario by reviewing the simulation log. An evaluator may be either a human evaluator who manually reviews the simulation log or a software evaluator that automatically reviews the simulation log. A software evaluator may review the simulation log to determine whether certain performance metrics are met. Different software evaluators may evaluate different aspects of the autonomous vehicle's performance during the simulation. For example, one evaluator may evaluate whether the autonomous vehicle behaves properly at a stop light, while another evaluator may evaluate whether the autonomous vehicle behaves properly in the presence of a pedestrian.

Autonomous vehicle simulations may generate large amounts of data. In some examples, a simulation log may contain thousands of messages per second. Thus, if a software evaluator were to review an entire simulation log, significant amount of computing resources may be required. However, it may not be necessary for a particular evaluator to review an entire simulation log to evaluate vehicle performance. For example, only a portion of a simulated driving scenario may involve the presence of a pedestrian. Thus, a software evaluator that detects performance around pedestrians need not evaluate portions of the simulation log in which there is no pedestrian present. Furthermore, a human evaluator is only able to review a small portion of a simulation log.

Accordingly, as disclosed herein, scenario markers may be inserted into a simulation log. The scenario markers may identify different portions of the simulation log. Scenario markers may also identify events of interest within different portions of the simulation log. For example, a scenario marker may identify that during a particular portion of a simulation log, the vehicle is expected to stop at a stop light. Accordingly, an evaluator may utilize the scenario markers to only review relevant portions of the simulation log. This may reduce the computing resources utilized by a software evaluator or reduce the time needed by a human evaluator to review the simulation. In addition, an evaluator may utilize the identified events of interest to evaluate the vehicle's performance. For example, if a vehicle was expected to turn during a certain portion of a simulation, the evaluator may determine whether the vehicle executed the expected turn. As such, the scenario markers, as disclosed herein, may improve the performance of autonomous vehicle simulation evaluation.

Figure 1:
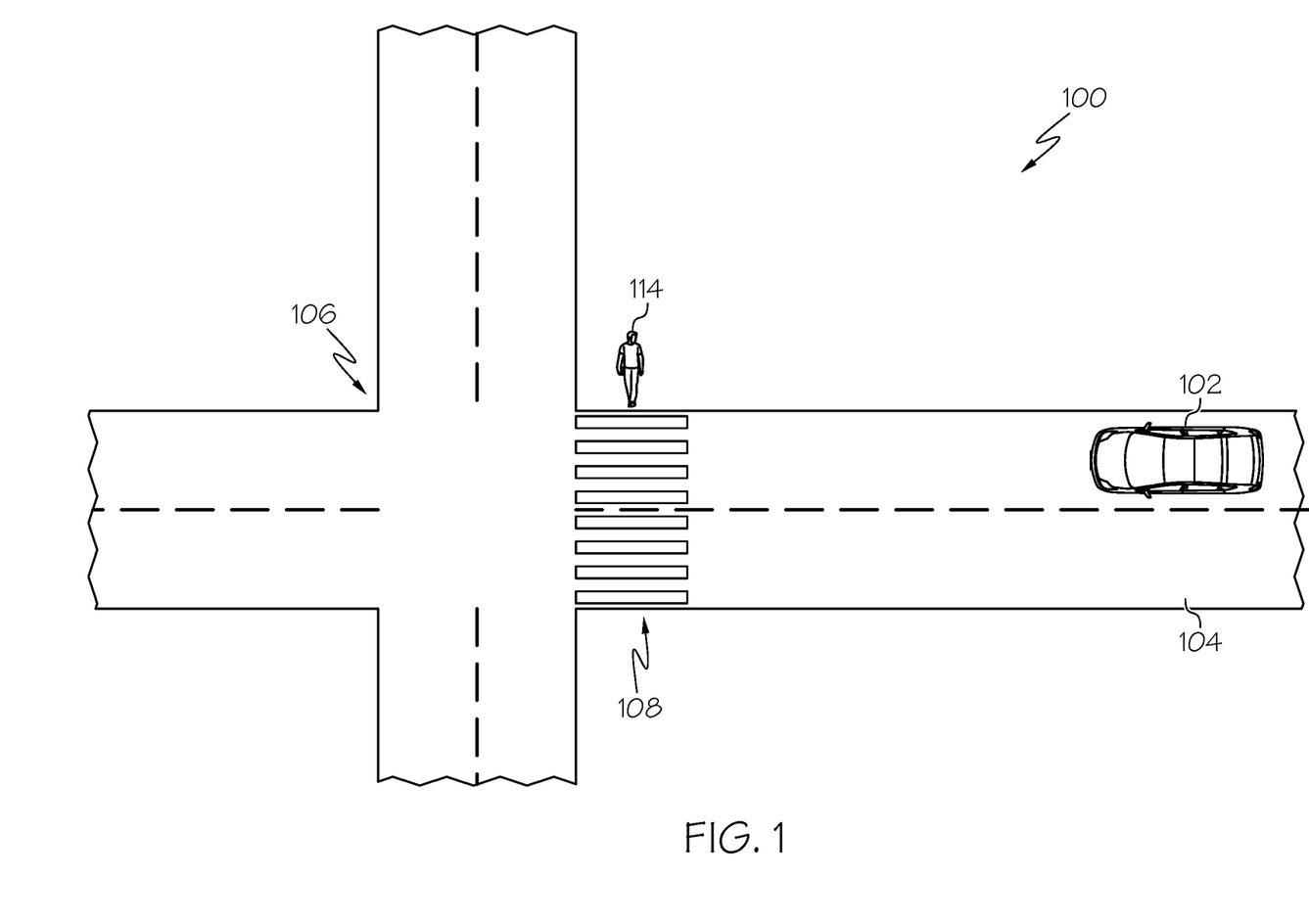
FIG. 1 schematically depicts an exemplary image from a driving scenario that may be simulated, according to one or more embodiments shown and described herein.

Turning now to the figures, FIG. 1 schematically depicts an exemplary image 100 from a driving scenario that may be simulated as disclosed herein. In the image 100, an autonomous vehicle 102 drives along a road 104 approaching an intersection 106. A crosswalk 108 is present near the intersection 106 and a pedestrian 110 is about to cross the road 104 using the crosswalk 108. The driving scenario may involve the pedestrian 110 crossing the road 104 while the autonomous vehicle 102 approaches the crosswalk 108. During a simulation of the driving scenario depicted in FIG. 1, simulated sensor data may be input to the autonomous driving software of the vehicle 102. The simulated sensor data may comprise sensor data that may be generated by the sensors of the vehicle 102 in a real-world driving situation comparable to the simulated driving scenario. The actions of the vehicle 102 in the simulated environment may then be monitored to determine how the vehicle 102 would perform in an analogous real-world situation. Details of the autonomous vehicle simulation are discussed in further detail below. While a scene from an exemplary driving scenario is shown in FIG. 1, it should be understood that this disclosure is not limited to any particular driving scenario.

Figure 2:
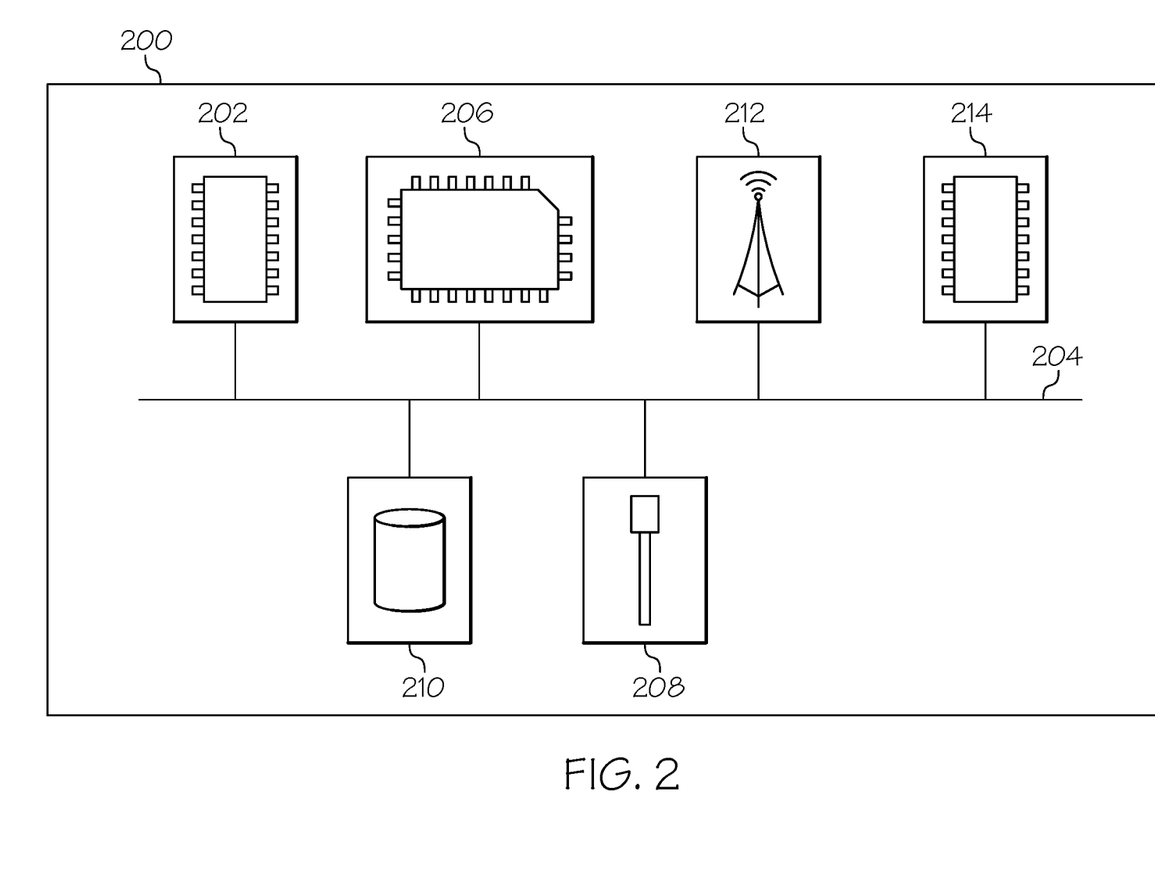
FIG. 2 depicts a schematic diagram of an example vehicle system, according to one or more embodiments shown and described herein.

FIG. 2 depicts an example vehicle system 200 included in the autonomous vehicle 102 of FIG. 1. The vehicle system 200 includes one or more processors 202, a communication path 204, one or more memory modules 206, a satellite antenna 208, one or more vehicle sensors 210, network interface hardware 212, and an autonomous driving module 214, the details of which will be set forth in the following paragraphs. It should be understood that the vehicle system 200 of FIG. 2 is provided for illustrative purposes only, and that other vehicle systems 200 comprising more, fewer, or different components may be utilized.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The example vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the example vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208 or an object positioned near the satellite antenna 208, by the one or more processors 202. Thus, the satellite antenna 208 allows the vehicle 102 to monitor its location.

The example vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors, proximity sensors, location sensors), and the like. The vehicle sensors 210 may be used to navigate the autonomous vehicle 102. In addition, the vehicle sensors 210 may detect information regarding other road agents, such as the pedestrian 114 in the example of FIG. 1.

Still referring to FIG. 2, the example vehicle system 200 comprises network interface hardware 212 for communicatively coupling the vehicle system 200 to one or more remote computing devices. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol.

Still referring to FIG. 2, the example vehicle system 200 comprises an autonomous driving module 214. The autonomous driving module 214 is coupled to the communication path 204 and communicatively coupled to the one or more processors 202. The autonomous driving module 214 causes the vehicle 102 to be autonomously driven based on data gathered by the vehicle sensors 210 and information about the driving state of the vehicle 102, such as speed and orientation. That is, the autonomous driving module 214 may adjust the acceleration, braking, steering, and other features of the vehicle 102 to navigate the vehicle along a road to a desired destination. In embodiments, the autonomous driving module 214 may comprise autonomous driving software that receives, as an input, sensor data from the vehicle sensors 210 and information about the driving state of the vehicle 102, and outputs driving instructions (e.g., adjustments to the acceleration, braking, and steering of the vehicle 102). In other embodiments, no separate autonomous driving module hardware is used. In these examples, one or more processors and memory modules may perform autonomous driving functions.

Figure 3:
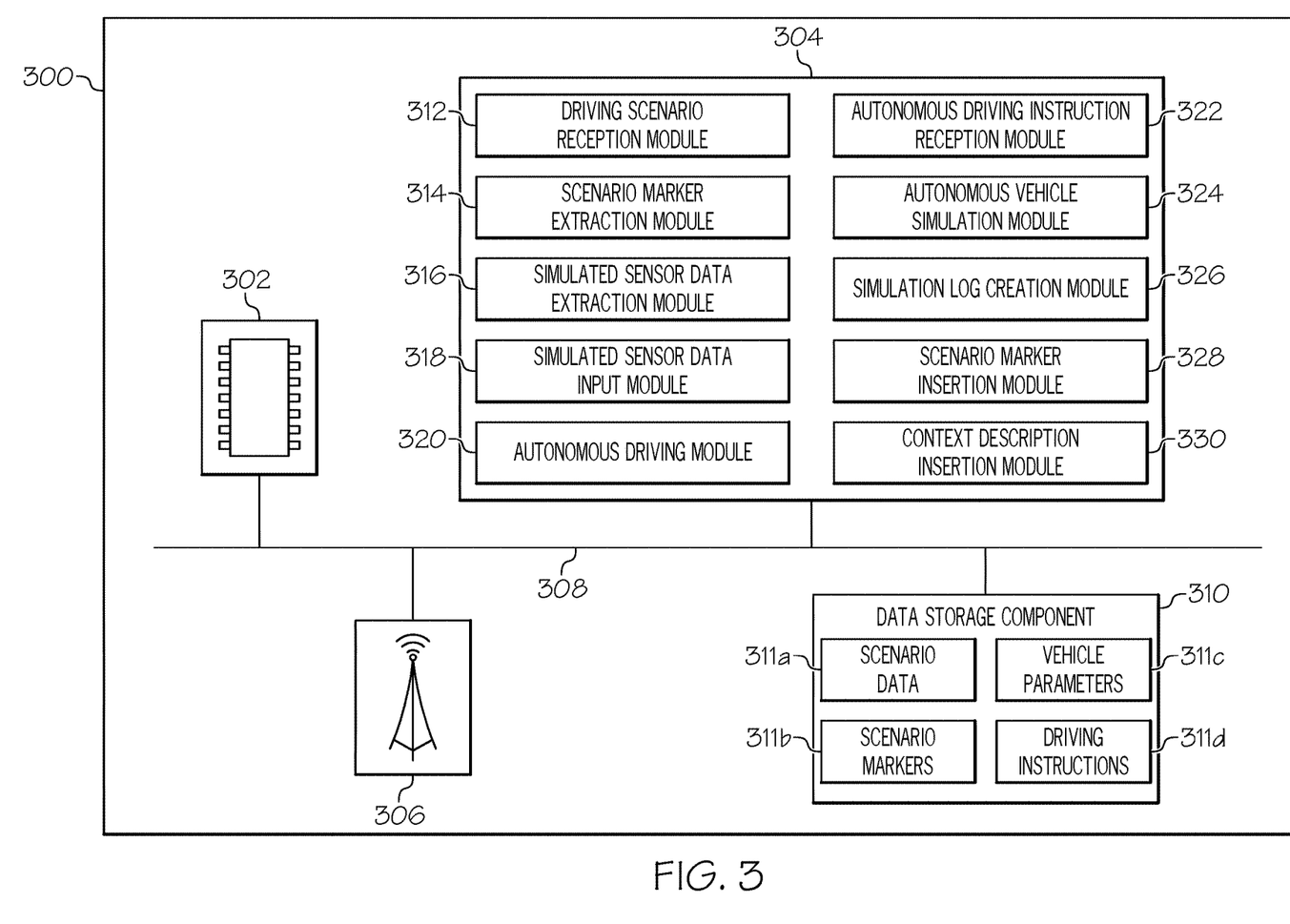
FIG. 3 depicts a schematic diagram of an example autonomous driving simulation system, according to one or more embodiments shown and described herein.

Turning now to FIG. 3, an autonomous vehicle simulation system 300 is shown. The autonomous vehicle simulation system 300 is configured to perform a simulation of the autonomous vehicle 102 of FIG. 1. The autonomous vehicle simulation system 300 may simulate the performance of the autonomous vehicle 102 in varying driving scenarios. One or more evaluators may then evaluate the performance of the autonomous vehicle 102 during a simulation. The autonomous driving software of the autonomous vehicle 102 may then be updated to improve the driving performance of the autonomous vehicle 102. As such, the autonomous vehicle simulation system 300 allows the autonomous vehicle 102 to be tested in a simulated environment before deploying the autonomous vehicle 102 onto real world streets in real driving scenarios.

Referring to FIG. 3, the autonomous vehicle simulation system 300 comprises one or more processors 302, one or more memory modules 304, network interface hardware 306, a communication path 308, and a data storage component 310. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302. The communication path 308 provides signal interconnectivity between various modules of the autonomous vehicle simulation system 300.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the autonomous vehicle simulation system 300 may transmit and receive data to and from the vehicle 102.

The data storage component 310 may store data that may be used during operation of the autonomous vehicle simulation system 300. In embodiments, the data storage component 310 may store scenario data 311a, scenario markers 311b, vehicle parameters 311c, and driving instructions 311d, as explained in further detail below. In addition, other data may be stored on the data storage component 310.

The one or more memory modules 304 include a driving scenario reception module 312, a scenario marker extraction module 314, a simulated sensor data extraction module 316, a simulated sensor data input module 318, an autonomous driving module 320, an autonomous driving instruction reception module 322, an autonomous vehicle simulation module 324, a simulation log creation module 326, a scenario marker insertion module 328, and a context description insertion module 330. Each of the driving scenario reception module 312, the scenario marker extraction module 314, the simulated sensor data extraction module 316, the simulated sensor data input module 318, the autonomous driving module 320, the autonomous driving instruction reception module 322, the autonomous vehicle simulation module 324, the simulation log creation module 326, the scenario marker insertion module 328, and the context description insertion module 330 may be a program module in the form of operating systems, application program modules, and other program modules stored in one or more memory modules 304. In some embodiments, the program module may be stored in a remote storage device that may communicate with the autonomous vehicle simulation system 300. In some embodiments, one or more of the driving scenario reception module 312, the scenario marker extraction module 314, the simulated sensor data extraction module 316, the simulated sensor data input module 318, the autonomous driving module 320, the autonomous driving instruction reception module 322, the autonomous vehicle simulation module 324, the simulation log creation module 326, the scenario marker insertion module 328, and the context description insertion module 330 may be stored remotely from the autonomous vehicle simulation system 300. Such a program module may include, but is not limited to, routines, subroutines, programs, objects, components, data structures and the like for performing specific tasks or executing specific data types as will be described below.

The driving scenario reception module 312 may receive a driving scenario to be simulated by the autonomous vehicle simulation system 300. A driving scenario received by the driving scenario reception module 312 may comprise any scenario or scenarios created by a scenario author. A driving scenario may involve pedestrians, bicyclists, other vehicles, traffic signs, traffic lights, or other agents or traffic infrastructures. For example, as shown in FIG. 1, an exemplary driving scenario may involve a pedestrian crossing a street at a crosswalk in front of a vehicle. Specifically, a driving scenario may comprise simulated values of data received by the sensors 210 of the vehicle system 200 during one or more driving situations. In some examples, a scenario author may use a framework to create a driving scenario. After the driving scenario reception module 312 receives a driving scenario, data associated with the driving scenario may be stored as scenario data 311a in the data storage component 310.

Referring back to FIG. 3, a scenario marker extraction module 314 may extract one or more scenario markers from a driving scenario. As explained above, the driving scenario reception module 312 may receive a driving scenario created by a scenario author. A driving scenario may comprise several different sections. For example, a driving scenario may start with a lead in phase during which the autonomous vehicle 102 reaches a certain speed and location and the substance of the driving scenario begins. In addition, the end of the driving scenario may include a shut down phase during which the vehicle slows down and completes the simulation after the substantive portion of the simulation has concluded. There is typically little or no value in evaluating the performance of the autonomous vehicle 102 during the lead in and shut down phases. As such, it may be desirable to mark these portions of the simulation accordingly.

In between the lead in phase and the shut down phase is typically the substantive portion of a driving scenario, which may be referred to herein as a scenario phase. The scenario phase may include a plurality of driving situations. For example, a scenario phase may first comprise a change in a traffic light, followed by a pedestrian crossing a street, followed by another vehicle approaching an intersection. When evaluating such as a driving scenario, it may be useful to for an evaluator to be aware of the different portions of the driving scenario. This may allow different evaluators to evaluate different portions of the simulation (e.g., one evaluator may evaluate the vehicle's response to a traffic light change, while another evaluator may evaluate the vehicle's response to the pedestrian crossing).

As such, the scenario marker extraction module 314 may extract scenario markers from the driving scenario received by the driving scenario reception module 312. The scenario markers may comprise delineations of different portions of a driving scenario. In one example, a scenario marker may comprise a timestamp and a description of different portions of a driving scenario. For example, one scenario marker may comprise a timestamp indicating when the lead in phase of a driving scenario begins, while another scenario marker may comprise a timestamp indicating when the shut down phase of a driving begins. Other scenario markers may comprise timestamps and descriptions of when other portions of a driving scenario begin.

In one example, a driving scenario received by the driving scenario reception module 312 may include timestamps and descriptions of scenario markers. In some examples, a scenario author may annotate a driving scenario with scenario markers indicating different sections of the driving scenario. A scenario author may also include an expected vehicle response as part of a scenario marker (e.g., a scenario marker may indicate that the autonomous vehicle 102 is expected to make a right turn at a certain point). All of this information may be included in a scenario marker description. In addition, any other details may be included in the scenario marker description as so desired by the scenario author.

In examples where a scenario author used a framework to create a driving scenario, the framework may automatically insert certain scenario markers into the driving scenario (e.g., timestamps delineating the lead in and shut down phases). In some examples, the scenario marker extraction module 314 may analyze a driving scenario and automatically identify scenario markers. In embodiments, the scenario marker extraction module 314 may identify scenario markers embedded in a driving scenario received by the driving scenario reception module 312. After extracting scenario markers, the scenario marker extraction module 314 may store the extracted scenario markers as scenario markers 311b in the data storage component 310.

Referring still to FIG. 3, the simulated sensor data extraction module 316 may extract sensor data associated with a driving scenario received by the driving scenario reception module 312. As explained above, a driving scenario may comprise sensor data simulating sensor data that may be received by the vehicle sensors 210 of the vehicle system 200 of the autonomous vehicle 102. This allows the autonomous vehicle simulation system 300 to simulate an actual driving experience of the autonomous vehicle 102 by submitting the simulated sensor data to the autonomous vehicle 102. Thus, the simulated autonomous vehicle 102 may generate driving instructions in response to the simulated sensor data in the same manner as would be done in response to actual sensor data received by the vehicle sensors 210.

Accordingly, the simulated sensor data extraction module 316 may extract sensor data from a driving scenario received by the driving scenario reception module 312. The simulated sensor data extraction module 316 may then store the extracted sensor data as scenario data 311a in the data storage component 310. The extracted sensor data may be used to perform a simulation of a driving scenario, as explained in further detail below.

Referring still to FIG. 3, the simulated sensor data input module 318 may input simulated sensor data into the autonomous driving module 320. As explained above, simulated sensor data may be used to simulate data captured by the vehicle sensors 210 of the vehicle system 200. Accordingly, the simulated sensor data input module 318 may input simulated sensor data to the autonomous driving module 320 to simulate data being captured by the vehicle sensors 210. The simulated sensor data input module 318 may input sensor data extracted by the simulated sensor data extraction module 316. In some examples, the simulated sensor data input module 318 may input sensor data stored in the data storage component 310. The simulated sensor data input module 318 may continually input sensor data relating to a driving scenario to the autonomous driving module 320 over time. This may allow the autonomous vehicle simulation system 300 to simulate data being continually captured by the vehicle sensors 210 over time, as would be the case in an actual driving environment.

Referring still to FIG. 3, the autonomous driving module 320 may be constructed in a similar manner as the autonomous driving module 214 of the vehicle system 200. Specifically, the autonomous driving module 320 may comprise the autonomous driving software that may be included in the autonomous driving module 214 of the vehicle system 200. The autonomous driving software of the autonomous driving module 320 may receive simulated sensor data from the simulated sensor data input module 318 and may output driving instructions based on the received sensor data. The autonomous driving software of the autonomous driving module 320 may perform object detection based on the simulated sensor data and may perform other software functions that may be used to determine driving instructions. Accordingly, the autonomous driving module 320 may allow the autonomous vehicle simulation system 300 to observe, while in a simulated environment, how the autonomous vehicle 102 may behave in actual driving situations.

Referring still to FIG. 3, the autonomous driving instruction reception module 322 may receive driving instructions output by the autonomous driving module 320. As explained above, the autonomous driving module 320 may output driving instructions in response to simulated sensor data input. Thus, the driving instructions output by the autonomous driving module 320 may be received by the autonomous driving instruction reception module 322. The autonomous driving instruction reception module 322 may store received driving instructions in the data storage component 310.

Referring still to FIG. 3, the autonomous vehicle simulation module 324 may simulate the behavior of the autonomous vehicle 102 in a simulated environment. Specifically, the autonomous vehicle simulation module 324 may continually update the status of a simulated environment based on simulated sensor data and driving instructions output by the autonomous driving module 320. As explained above, the autonomous vehicle simulation system 300 is configured to simulate a driving environment of the autonomous vehicle 102. A driving scenario received by the driving scenario reception module 312 includes sensor data to simulate a particular driving situation. The autonomous driving module 320 outputs driving instructions based on the simulated sensor data. Thus, the autonomous vehicle simulation module 324 may update the status of the simulated autonomous vehicle 102 and other simulated road agents that are part of a driving scenario based on the simulated sensor data and the driving instructions output by the autonomous driving module 320. The updated status of the simulated autonomous vehicle 102 and road agents may be stored in the data storage component 310. Accordingly, the autonomous vehicle simulation module 324 allows the autonomous vehicle simulation system 300 to keep track of the simulated driving environment involving the autonomous vehicle 102.

Referring still to FIG. 3, the simulation log creation module 326 may create a simulation log based on the results of a simulation performed by the autonomous vehicle simulation system 300. Specifically, the simulation log creation module 326 may create a simulation log that records events that occurred during the driving simulation. In embodiments, the simulation log creation module 326 may create a simulation log having a plurality of timestamps associated with a length of the simulation and an indication of events that occurred at each timestamp during the simulation. In one example, the simulation log may include a record of sensor data input to the autonomous driving module 320 and driving instructions output by the autonomous driving module 320 at each point during the simulation. In some examples, the simulation log may include indications of the status of the simulated autonomous vehicle 102 (e.g., velocity of the vehicle, direction of travel of the vehicle, object detection performed by the autonomous driving module 320, etc.). In some examples, the simulation log may include a record of driving actions taken by the autonomous vehicle 102 at different points during a simulation (e.g., turns, stops, braking acceleration, and the like). A simulation log may be reviewed by an evaluator (e.g., a human evaluator or a software evaluator) to evaluate the performance of the autonomous driving module 320. As such, the autonomous driving software on the autonomous driving module 320 may be updated as needed to improve the performance of the autonomous driving module 320.

Referring still to FIG. 3, the scenario marker insertion module 328 may insert scenario markers into the simulation log created by the simulation log creation module 326. In embodiments, the scenario marker insertion module 328 may insert scenario markers extracted by the scenario marker extraction module 314 into a simulation log. In one example, the scenario marker extraction module 314 may extract scenario markers from a driving scenario having timestamps and associated descriptions. Thus, the scenario marker insertion module 328 may match the timestamps of the scenario markers extracted by the scenario marker extraction module 314 to the timestamps of the simulation log created by the simulation log creation module 326 and insert the extracted scenario markers into the simulation log at the appropriate timestamps. In one example, the scenario markers inserted by the scenario marker insertion module 328 may comprise text IDs or text descriptions to identify different sections of a simulation (e.g., lead in phase, scenario phase, shut down phase).

As such, when the simulation log is reviewed by an evaluator, the evaluator may utilize the scenario markers in the simulation log to improve the performance of the evaluation. When a software evaluator reviews a simulation log, the software evaluator may utilize the scenario markers to review only relevant portions of the simulation log (e.g., a software evaluator that evaluates whether the autonomous vehicle 102 performs turns properly may only review portions of the simulation where a vehicle turn was either expected and/or occurred). When a human evaluator reviews a simulation log, the human evaluator may utilize the scenario markers to review portions of interest.

Referring still to FIG. 3, the context description insertion module 330 may insert a context description at certain points in the simulation log created by the simulation log creation module 326. When a human evaluator reviews a simulation log, the evaluator may rely on the scenario markers inserted by the scenario marker insertion module 328 to locate a relevant section of the simulation that they are interested in reviewing. However, a scenario marker may merely indicate a start of a particular section or event in a simulation. For example, a scenario marker may indicate that a traffic light has changed at a particular timestamp. However, that scenario marker may not indicate previous events that have happened in the simulation. For example, at the time when the traffic light changes, there may be a pedestrian in the street who had previously began crossing the street at an earlier timestamp. If the human evaluator jumps immediately to the scenario marker indicating the traffic light change, the evaluator may not be aware of an earlier indication that the pedestrian began crossing the street. As such, the human evaluator may not be aware of the full context of the simulated driving environment, which may hinder the evaluators ability to properly evaluate the simulation.

Accordingly, the context description insertion module 330 may insert additional scenario markers at various points in the simulation log, or revise scenario markers inserted by the scenario marker insertion module 328, to indicate context of the simulated driving environment. The additional scenario markers may include information from previous scenario markers or previous events in the simulation log that are still relevant to the driving environment at a later time. For example, in the situation discussed above, if one scenario marker indicates that a pedestrian has entered a crosswalk and a later scenario marker indicates a traffic light change at a time when the pedestrian is still in the crosswalk, the context description insertion module 330 may modify the scenario marker indicating the traffic light change to further indicate the presence of the pedestrian in the crosswalk.

Figure 4:
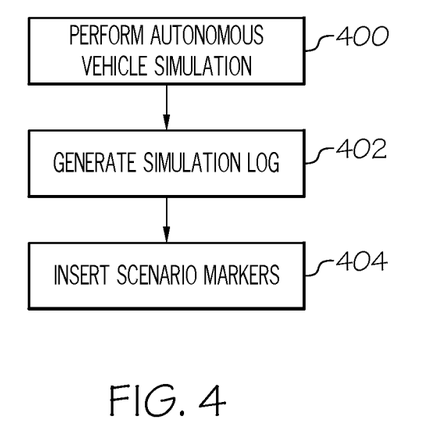
FIG. 4 depicts a flowchart of an example method of performing an autonomous vehicle simulation, according to one or more embodiments shown and described herein.

FIG. 4 depicts a flowchart of an example method of inserting scenario markers into a simulation log, according to one or more embodiments shown and described herein.

At step 400, the autonomous vehicle simulation module 324 performs a simulation of an autonomous vehicle. The simulation may comprise inputting simulated sensor data into the autonomous driving module 320 and updating a vehicle status of the simulated autonomous vehicle based on the output of the autonomous driving module 320. The output of the autonomous driving module 320 may comprised driving instructions based on the simulated sensor data.

At step 402, the simulation log creation module 326 generates a simulation log based on the simulation. The simulation log may comprise the simulated sensor data and the driving instructions output by the autonomous driving module 320. The simulation log may also comprise a vehicle status of the autonomous vehicle at a plurality of times during the simulation.

At step 404, the scenario marker insertion module 328 inserts one or more scenario markers into the simulation log. The one or more scenario markers may indicate one or more phases of the simulation. For example, the one or more scenario markers may indicate a lead in phase of the simulation and a shut down phase of the simulation.

Figure 5:
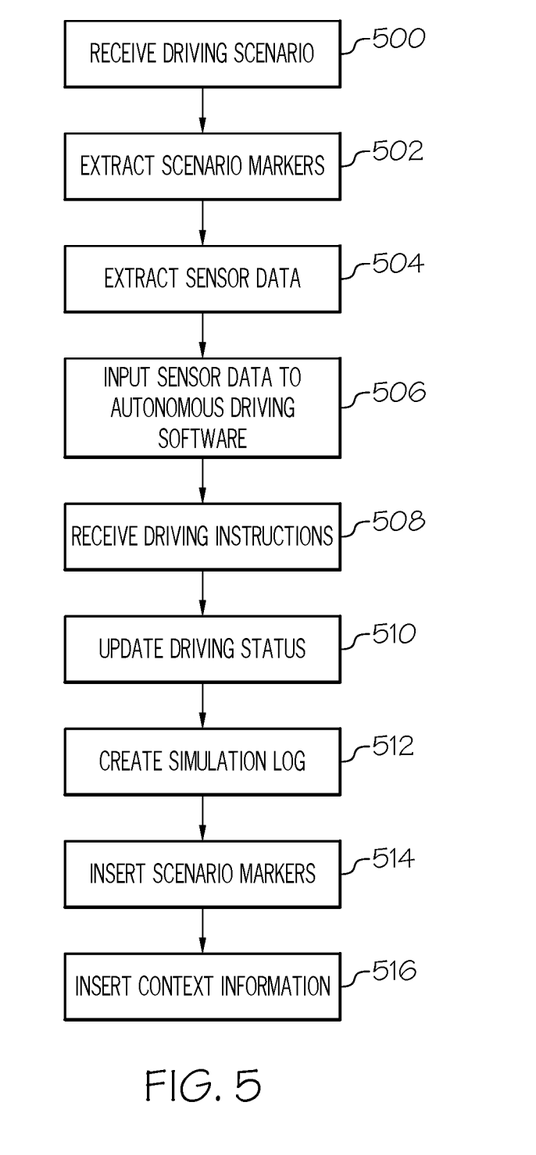
FIG. 5 depicts a flowchart of another example method of performing an autonomous vehicle simulation, according to one or more embodiments shown and described herein.

FIG. 5 depicts a flowchart of another example method of inserting scenario markers into a simulation log, according to one or more embodiments shown and described herein. At step 500, the driving scenario reception module 312 receives driving scenario data. The driving scenario data may comprise simulated sensor data comprising one or more driving scenarios. The driving scenario data may comprise different phases, including a lead in phase, a scenario phase, and a shut down phase. The driving scenario data may also include scenario markers indicating the different phases of the driving scenario data. The driving scenario data may further comprise timestamps associated with each of the one or more scenario markers.

At step 502, the scenario marker extraction module 314 extracts scenario markers from the driving scenario data. The scenario marker extraction module 314 may extract scenario marker descriptions as well as associated timestamps of the scenario markers. At step 504, the simulated sensor data extraction module 316 extracts the simulated sensor data form the driving scenario data.

At step 506, the simulated sensor data input module 318 inputs sensor data to the autonomous driving module 320. This may comprise inputting the simulated sensor data to autonomous driving software on the autonomous driving module 320. In response to receiving the simulated sensor data, the autonomous driving module 320 may output driving instructions based on the simulated sensor data. At step 508, the autonomous driving instruction reception module 322 receives the driving instructions output by the autonomous driving module 320.

At step 510, the autonomous vehicle simulation module 324 updates driving status of a simulated autonomous vehicle based on the simulated sensor data and the driving instructions received by the autonomous driving instruction reception module 322. The updated driving status of the simulated autonomous vehicle may comprise velocity, driving direction, objects detected by the autonomous driving module 320, and the like.

At step 512, the simulation log creation module 326 creates a simulation log. The simulation log may comprise the simulated sensor data and the driving instructions received by the autonomous driving instruction reception module 322. The simulation log may also comprise a vehicle status of the autonomous vehicle at a plurality of times during the simulation.

At step 514, the scenario marker insertion module 328 inserts scenario markers into the simulation log created by the simulation log creation module 326. The scenario marker insertion module 328 may insert the scenario markers into the simulation log at the timestamps of the scenario markers extracted by the scenario marker extraction module 314.

At step 516, the context description insertion module 330 inserts context descriptions into the scenario markers inserted by the scenario marker insertion module 328. The context descriptions may comprise information associated with previous scenario markers. The context descriptions may provide context to a human reviewer when reviewing a certain portion of the simulation log.

It should now be understood that embodiments described herein are directed to systems and methods for implementing scenario marker infrastructure. A driving scenario may be input to an autonomous vehicle simulation system. The driving scenario may include simulated sensor data and scenario markers delineating different phases of the driving scenario. The sensor data and the scenario markers may be extracted from the driving scenario. The simulated sensor data may be input to an autonomous driving module, which may output driving instructions based on the sensor data. A simulation log may be created comprising the simulated sensor data and the corresponding driving instructions. The scenario markers may be inserted into the simulation log at the appropriate locations. Additional context information may be included in the scenario marker descriptions. The simulation log may then be output to one or more human and/or software evaluators such that the performance of the autonomous driving module may be evaluated. The evaluators may utilize the scenario markers in the simulation log to limit the portions of the simulation log to evaluate, thereby improving the performance of the evaluators.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    receiving driving scenario data comprising simulated sensor data associated with one or more driving scenarios to be received by one or more sensors of an autonomous vehicle during a simulation of the autonomous vehicle;
    receiving one or more scenario markers indicating timestamps of one or more different portions of the one or more driving scenarios;
    extracting the scenario markers from the driving scenario data;
    performing, by one or more processors, a simulation of autonomous vehicle based on the simulated sensor data;
    generating a simulation log comprising driving actions performed by the autonomous vehicle during the simulation, based on the simulated sensor data; and
    inserting the scenario markers into the simulation log at the timestamps of the one or more different portions of the one or more driving scenarios.

2. The method of claim 1, wherein performing the simulation of the autonomous vehicle comprises:
    inputting the simulated sensor data into autonomous driving software;
    receiving data output by the autonomous driving software; and
    updating a driving status of the autonomous vehicle based on the data output by the autonomous driving software.

3. The method of claim 2, wherein the data output by the autonomous driving software comprises driving instructions based on the simulated sensor data.

4. The method of claim 3, wherein the simulation log comprises the simulated sensor data and the driving instructions.

5. The method of claim 1, wherein the simulation log comprises a vehicle status of the autonomous vehicle at a plurality of times during the simulation.

6. The method of claim 1, wherein the one or more scenario markers comprise context information regarding a state of the simulation.

7. The method of claim 1, wherein at least one of the one or more scenario markers comprises information relating to one or more previous scenario markers.

8. The method of claim 1, wherein the different portions of the one or more driving scenarios include a lead in phase of the simulation and a shut down phase of the simulation.

9. An autonomous driving simulation system comprising:
    one or more processors;
    one or more memory modules; and
    machine readable instructions stored in the one or more memory modules that, when executed by the one or more processors, cause the system to:
    receive driving scenario data comprising simulated sensor data associated with one or more driving scenarios to be received by one or more sensors of an autonomous vehicle during a simulation of the autonomous vehicle;
    receive one or more scenario markers indicating timestamps of one or more different portions of the one or more driving scenarios;
    extract the scenario markers from the driving scenario data;
    perform a simulation of the autonomous vehicle based on the simulated sensor data;
    generate a simulation log comprising driving actions performed by the autonomous vehicle during the simulation, based on the simulated sensor data; and
    insert the scenario markers into the simulation log at the timestamps of the one or more different portions of the one or more driving scenarios.

10. The system of claim 9, wherein the machine readable instructions, when executed, cause the system to:
    input the simulated sensor data into autonomous driving software;
    receive driving instructions output by the autonomous driving software; and
    update a driving status of the autonomous vehicle based on the driving instructions output by the autonomous driving software.

11. The system of claim 10, wherein the simulation log comprises the simulated sensor data and the driving instructions.

12. The system of claim 9, wherein the simulation log comprises a vehicle status of the autonomous vehicle at a plurality of times during the simulation.

13. The system of claim 9, wherein at least one of the one or more scenario markers comprises information relating to one or more previous scenario markers.

* * * * *